United States Patent [19]

Uchida

[11] Patent Number: 4,690,039

[45] Date of Patent: Sep. 1, 1987

[54] AIR CONDITIONER FOR VEHICLE

[75] Inventor: Goro Uchida, Toyota, Japan

[73] Assignee: Toyota Jidosha Kabushiki Kaisha, Aichi, Japan

[21] Appl. No.: 936,985

[22] Filed: Dec. 1, 1986

Related U.S. Application Data

[63] Continuation of Ser. No. 761,664, Aug. 1, 1985, abandoned, which is a continuation of Ser. No. 557,924, Dec. 5, 1983, abandoned.

[30] Foreign Application Priority Data

Feb. 8, 1983 [JP] Japan ................... 58-17218

[51] Int. Cl.[4] ............................... B60H 1/24
[52] U.S. Cl. ................................... 98/2.08
[58] Field of Search .............. 98/2.05, 2.06, 2.08, 98/2.11

[56] References Cited

U.S. PATENT DOCUMENTS

| 4,216,822 | 8/1980 | Izumi ........................ 98/2.06 |
| 4,223,754 | 9/1980 | Mizuno et al. ............... 98/2.08 |
| 4,227,569 | 10/1980 | Wattin ................... 237/12.03 A |
| 4,356,966 | 11/1982 | Kado ....................... 165/42 |
| 4,383,642 | 5/1983 | Sumikawa et al. ............. 236/13 |
| 4,406,214 | 9/1983 | Sakurai ..................... 98/2.08 |
| 4,408,714 | 10/1983 | Kobayashi ................... 98/2.08 |
| 4,531,671 | 7/1985 | Schwenk ..................... 98/2.08 |

FOREIGN PATENT DOCUMENTS

| 47906 | 1/1979 | Fed. Rep. of Germany .. 237/12.3 A |
| 95212 | 6/1982 | Japan ..................... 908/2.05 |
| 884918 | 12/1961 | United Kingdom ............ 165/42 |

Primary Examiner—Robert E. Garrett
Assistant Examiner—John Kwon
Attorney, Agent, or Firm—Parkhurst & Oliff

[57] ABSTRACT

An air conditioner for a vehicle which has a first chamber having a heat exchanger, a second chamber having at least one ventilation diffuser and a third chamber having heater and defroster diffusers, said third chamber being connected in the downstream of said second chamber, and a switching damper provided to control the communication between said second chamber and said third chamber. The air conditioner has a remarkably small air resistance and can obtain sufficient air flow rate in the ventilating made both dynamic pressure or other forcible types and has the degree of freedom necessary for designing a predetermined space in the lower portion of the chamber having the ventilation diffusers.

10 Claims, 6 Drawing Figures 4,690,039

AIR CONDITIONER FOR VEHICLE

This is a continuation of application Ser. No. 761,664 filed Aug. 1, 1985 now abandoned which in turn is a continuation of Ser. No. 557,924, Dec. 5, 1983 now abandoned.

BACKGROUND OF THE INVENTION

The present invention relates to improvements in an air conditioner for vehicles.

A conventional air conditioner is constructed, as shown in FIGS. 5 and 6, to form a predetermined space in the lower portion of a chamber having a ventilation diffuser. In this air conditioner, a chamber B having a heat exchanger A and a chamber E having a heater diffuser C and a defroster diffuser D are partitioned by a throttle wall F, a chamber J having ventilation diffusers G, H and I are provided at the downstream side of the chamber E, and a space K is formed in the lower portion of the chamber J.

In the structure of the above conventional air conditioner, it is necessary to provide a throttle by the throttle wall so as to control the air temperature responsive to the modes of heating, defrosting and ventilating. The chamber E serves as a chamber for mixing the air. Since the chamber J is disposed in the downstream side of the chamber E, ventilating resistance largely increases due to the increases in the air passages and the throttles by the throttle wall. Consequently, this conventional air conditioner causes insufficient ventilation air flow rate even by dynamic pressure or forcible type in the ventilating mode.

SUMMARY OF THE INVENTION

Accordingly, an object of the present invention is to provide an air conditioner for a vehicle in which the aforementioned drawbacks of the prior art air conditioner are eliminated, and ventilating resistance is decreased in the ventilating mode, thereby obtaining sufficient air flow rate at the ventilating mode of many dynamic pressure and forcible types.

These and other objects features will become more apparent from the following description of the preferred embodiments of the present invention when read in connection with the accompanying drawings.

DESCRIPTION OF THE PREFERRED EMBODIMENTS

The present invention will now be described in more detail with reference to the accompanying drawings.

Figure 1:
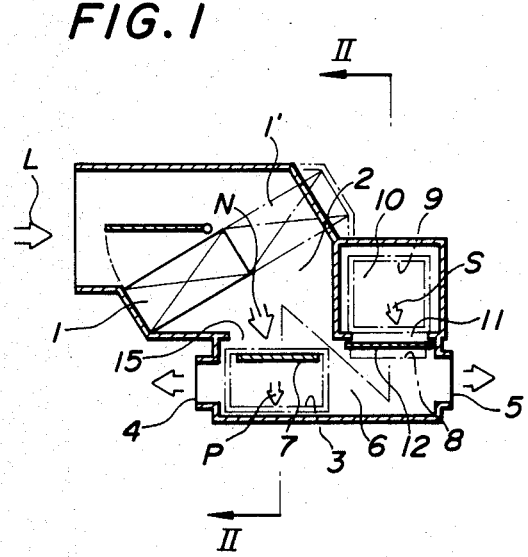
FIG. 1 is a plan view in section of an air conditioner according to a preferred embodiment of the present invention.
Figure 2:
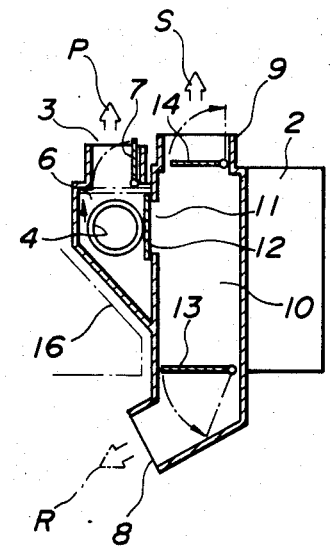
FIG. 2 is a longitudinal sectional side view taken along the line II—II in FIG. 1.

FIGS. 1 and 2 show a preferred embodiment of the present invention. A second chamber 6 having mid level ventilation diffusers 3, 4 and 5 is formed at the side directly in the downstream of a first chamber 2 having a heat exchanger 1. The diffuser 3 is opened or closed by a switching damper 7. Dampers for ventilation diffusers 4 and 5 are omitted in the drawings, but opened or closed with the switching damper 7.

A third chamber 10 having a heater diffuser 8 and a defroster diffuser 9 is connected at the downstream side of the chamber. The second and third chambers 6 and 10 communicate through a port 11 with each other, and the port 11 is opened or closed by a switching damper 12. The diffusers 8 and 9 are respectively opened or closed by switching dampers 13 and 14.

In the embodiment thus constructed, the first chamber 2 having the heat exchanger 1 and the second chamber 6 having the ventilation diffusers 3, 4 and 5 are connected directly through a short vent passage 15, so that the ventilating resistance in the ventilating mode can be reduced remarkably. The second chamber 6 can be disposed adjacent to the third chamber 10 having the diffuser 9 in the same manner as the conventional air conditioner, and a predetermined space 16 can be formed in the lower portion of the chamber 6.

It is noted that the position of the heat exchanger 1 alternatively may be located at the place designated by a dotted broken line 1' in FIG. 1 in this embodiment.

Figure 3:
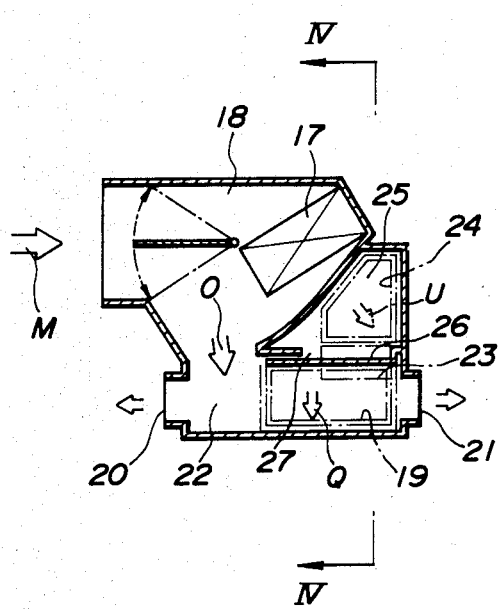
FIG. 3 is a plan view in section of another preferred embodiment of the present invention.
Figure 4:
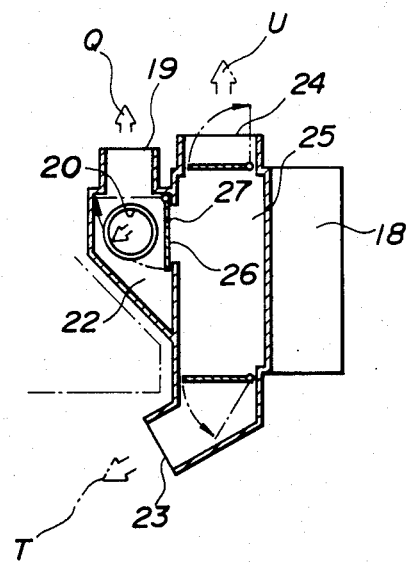
FIG. 4 is a longitudinal sectional side view taken along the line IV—IV in FIG. 3.
Figure 5:
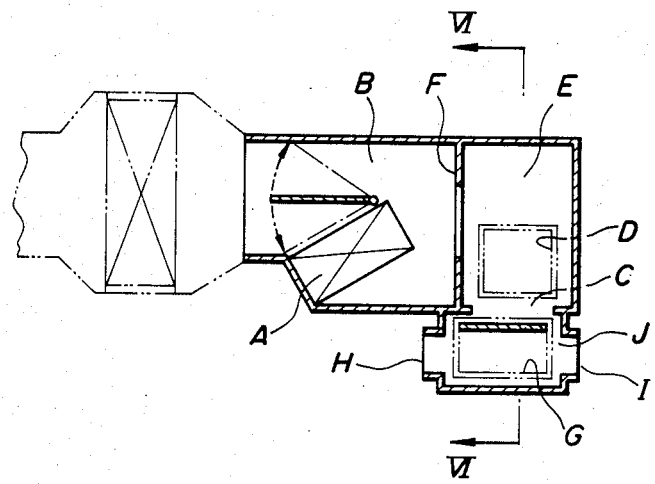
FIG. 5 is a plan view in section of a conventional air conditioner.
Figure 6:
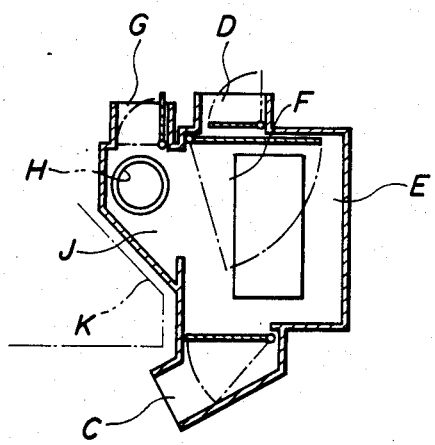
FIG. 6 is a longitudinal sectional side view taken along the line VI—VI in FIG. 5.

FIGS. 3 and 4 show another embodiment of the air conditioner for vehicles according to the present invention. This embodiment is constructed in the same manner as the first embodiment in that a second chamber 22 having ventilation diffusers 19, 20 and 21 is formed at the side in the downstream of a first chamber 18 having a heat exchanger 17 and a third chamber 25 having a heater diffuser 23 and a defroster diffuser 24 is formed at the downstream side of the chamber 22, but different from the first embodiment in that the ventilation diffuser 19 is displaced toward the third chamber side 25 and a switching damper 26 for opening and closing the diffuser 19 operates also as a switching damper for opening and closing a port 27 which communicates between the chambers 22 and 25.

In the first embodiment, the damper 12 of the port 11 is employed in addition to the damper 7 of the diffuser 3, while in this second embodiment, the diffuser 19 communicates with the port 27 by a sole damper 26, thereby simplifying the mechanism and the operation.

In an, the air conditioner of the present invention thus constructed, when air forcibly fed by a dynamic pressure or a blower is introduced into the chamber 2 or 18 as designated by an arrow L or M, it is immediately fed into the chamber 6 or 22 as designated by an arrow N or O, and diffused from the respective ventilation diffusers as designated by arrows P and Q. When the air is diffused from the diffuser 8 or 23 and 9 or 24 as designated by arrows R, S, T and U, sufficiently mixed conditioned air can be obtained even if the conventional throttle wall which produces the throttle operation and is necessary in the conventional air conditioner is not provided since the chamber 10 or 25 is provided downstream of the chamber 6 or 22, thereby increasing the length of the air passage.

Consequently, according to the present invention, the air conditioner has a remarkably small air resistance and can obtain sufficient air flow rate in the ventilating mode in both dynamic pressure or other forcible types and has the degree of freedom needed for to form designing to form a predetermined space in the lower portion of the chamber having the ventilation diffusers.

What is claimed is:

1. An air conditioner for a vehicle, comprising:

three chambers in series communication, a first chamber having an air inlet and a heat exchanger, a second chamber communicating with a downstream portion of said first chamber and having at least one mid-level directed ventilation diffuser, and a third chamber communicating with a downstream portion of said second chamber and having at least one downwardly directed heater diffuser and at least one upwardly directed defroster diffuser;

said first and third chambers being disposed adjacent to each other on opposite sides of a shared first common wall;

said second chamber being disposed adjacent to said first and third chambers such that said first common wall abuts a second common wall, a first portion of said second common wall being common to said first chamber and said second chamber and a remaining second portion of said second common wall being common to said third chamber and said second chamber, said first and second portions of said second common wall lying in a common plane;

said downstream portion of said first chamber communicating with said second chamber through a first opening in said second common wall;

said first chamber including therein a passage for directing air through said heat exchanger and a bypass for bypassing said heat exchanger to direct air from said inlet to said first opening, an air mix damper being located upstream of said heat exchanger for selectively controlling the relative amounts of air flowing through said passage and bypass of said first chamber;

said downstream portion of said second chamber communicating with said third chamber through a second opening in said second common wall, a switching damper being located within said second opening for selectively controlling communication between said second and third chambers.

2. The air conditioner according to claim 1, wherein said at least one ventilation diffuser of said second chamber comprises a central ventilation duct and left and right side ventilation ducts, and switching dampers are provided at said ducts.

3. The air conditioner according to claim 1, wherein switching dampers are provided at said heater and defroster diffusers of said third chamber.

4. The air conditioner according to claim 1, wherein said at least one ventilation duct is displaced toward said third chamber.

5. The air conditioner according to claim 1, wherein a damper for opening and closing said at least one ventilation duct also serves as the switching damper for opening and closing the second opening between said second chamber and said third chamber.

6. The air conditioner according to claim 2, wherein said central ventilation duct is displaced toward said third chamber.

7. The air conditioner according to claim 2, wherein the damper for opening and closing said central ventilation duct also operates as the switching damper for opening and closing the second opening between said second chamber and said third chamber.

8. The air conditioner according to claim 4, wherein the damper for opening and closing said central ventilation duct also operates as the switching damper for opening and closing the second opening between said second chamber and said third chamber.

9. The air conditioner of claim 1, wherein said first common wall is a unitary member.

10. The air conditioner of claim 1, wherein said second common wall is a unitary member.

* * * * *